No. 640,425. Patented Jan. 2, 1900.
W. W. SNOW.
BOLTLESS STEEL TIRED CAR WHEEL.
(Application filed Dec. 26, 1896.)

(No Model.) 2 Sheets—Sheet 1.

Witnesses
J. H. Hinkel
E. Everitt Ellis

Inventor
William W. Snow
by Foster Freeman
Attorney

THE NORRIS PETERS CO., PHOTO-LITHO., WASHINGTON, D. C.

No. 640,425. Patented Jan. 2, 1900.
W. W. SNOW.
BOLTLESS STEEL TIRED CAR WHEEL.
(Application filed Dec. 26, 1896.)
(No Model.) 2 Sheets—Sheet 2.

United States Patent Office.

WILLIAM W. SNOW, OF HILLBURN, NEW YORK.

BOLTLESS STEEL-TIRED CAR-WHEEL.

SPECIFICATION forming part of Letters Patent No. 640,425, dated January 2, 1900.

Application filed December 26, 1896. Serial No. 617,071. (No model.)

*To all whom it may concern:*

Be it known that I, WILLIAM W. SNOW, a citizen of the United States, residing at Hillburn, Rockland county, State of New York, have invented certain new and useful Improvements in Boltless Steel-Tired Car-Wheels, of which the following is a specification.

My invention relates to car-wheels, and more particularly to that class of car-wheels in which the tires are made separately and are secured to the body portion of the wheel; and it has for its object to improve and simplify the construction of such wheels, to produce a larger bearing-surface of the tire on the center or body portion and better support the tire in position, as well as to provide means for holding the tire against any possible slipping; and to these ends my invention consists in the various features of construction and arrangement of parts, substantially as hereinafter more particularly set forth.

Figure 1:
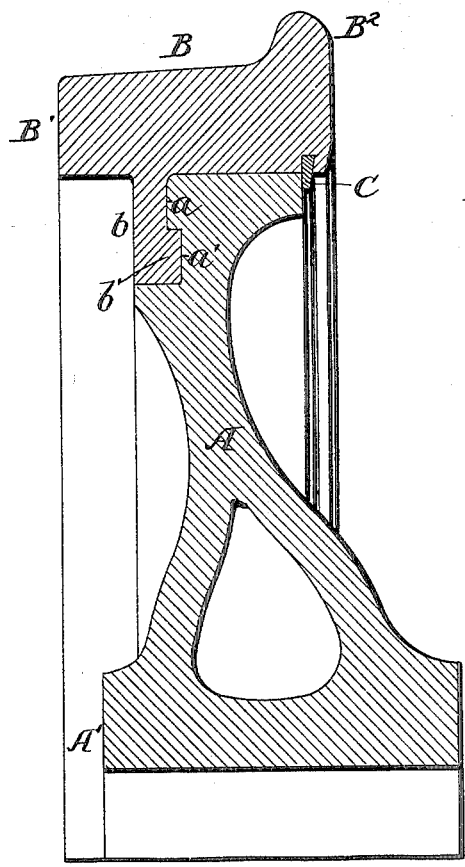
Figure 4:
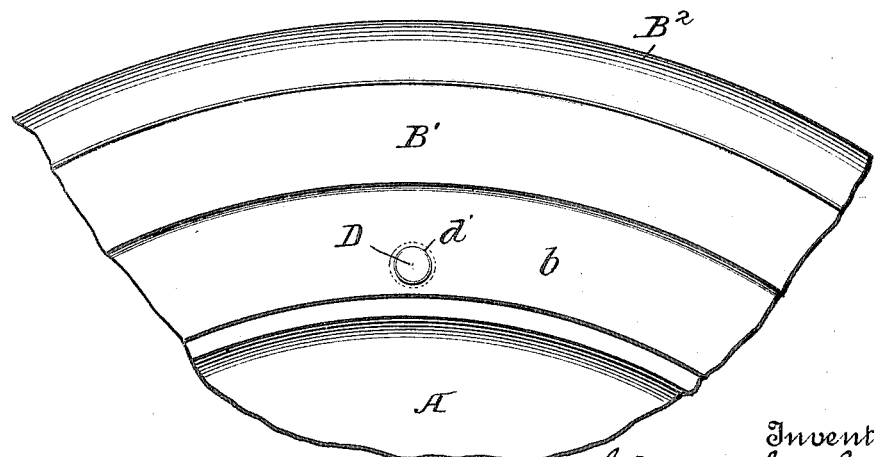
Figure 2:
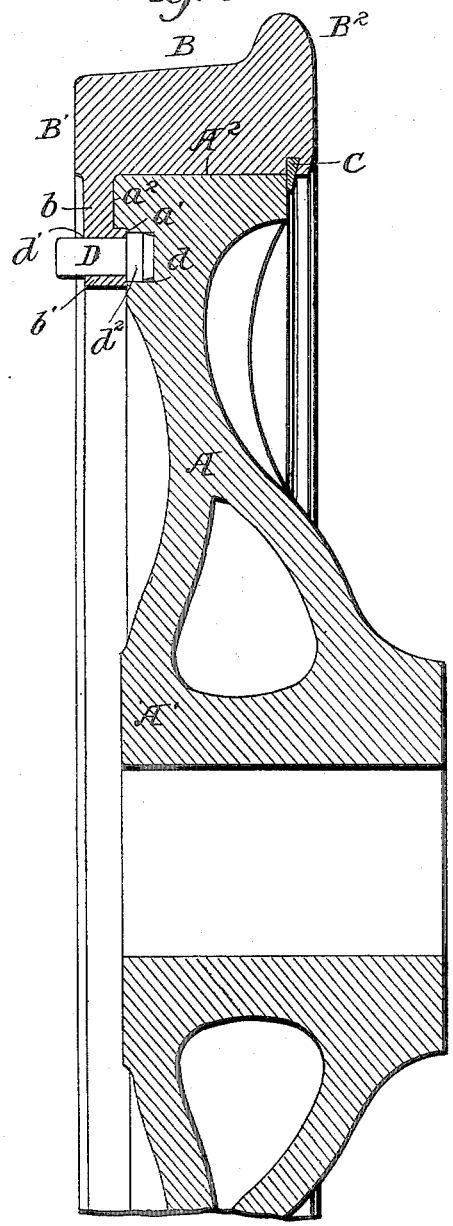
Figure 3:
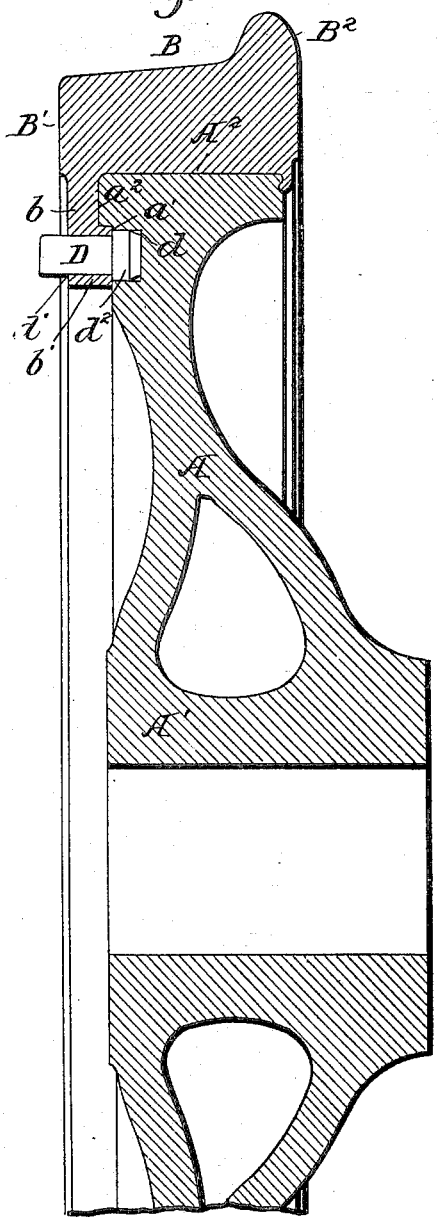

Referring to the accompanying drawings, Figure 1 is a part-sectional view of an old form of car-wheel. Fig. 2 is a part-sectional view showing my improvement applied to the kind of car-wheel illustrated in Fig. 1. Fig. 3 is a sectional view showing my improvement applied to another form of car-wheel; and Fig. 4 is a partial side view of the wheel, showing the dowel-pin.

My invention, as above intimated, relates more particularly to car-wheels in which the tires, usually of steel, are made separate from the body portion and are mounted on the latter and secured thereto in various ways. In my prior patents, No. 361,332, granted April 19, 1887, and No. 430,239, granted June 17, 1890, I have illustrated and claimed two forms of such car-wheels and the means of securing the tires to the body. Without describing these wheels in detail, as they are clearly shown in the patents, I will state that they consist generally of a body portion on which the tire is mounted, and the tire is provided with an inwardly-projecting annular flange engaging and locking into one side of the body portion, while it is held in position by a locking-ring or inwardly-turned flange on the other side. In both of these cases the inwardly-projecting annular flange connected to the tire was arranged at a distance from the outer edge of the tire. This construction will be more clearly understood in reference to Fig. 1, in which A represents the body of the wheel, which may be of any desired construction, having on its outer side a depression or cut-away portion $a$ and a groove $a'$, into which fits the lip $b'$ of the inwardly-extending annular flange $b$ of the tire B, while in this particular form the tire is held in position by an annular locking-ring C, all as more fully explained in my prior patents. It will be observed that in this construction the inwardly-extending annular flange $b$ of the tire B is arranged at quite a distance from the outer edge B' and nearly midway between said outer edge and the outer edge of the running rib or flange $B^2$. Furthermore, the outer surface of this inwardly-extending annular flange $b$ was within the outer face of the hub portion A' of the center or body portion of the wheel. While this construction of wheel has been found exceedingly effective in many respects, I have found that in order to meet the present requirements of railway traffic, especially to provide for high rates of speed and excessive wear, as well as to simplify the manufacture of the tire and cheapen its cost, it is desirable to give a more extended bearing-surface to the tire upon the center or body portion of the wheel, and I have accomplished this part of my invention by a construction such as is illustrated more particularly in Figs. 2 and 3. In each of these figures the body portion A, as before, may be made of any desired form, either as a single piece or with spokes or otherwise; but in all cases it is provided with an outer edge $A^2$, which is practically straight and parallel with the axis of the wheel. In my improved construction this outer edge is extended so that its portion or face $a^2$ is practically on a line with the outer face of the hub or center portion of the body A'. Formed in the face of this outer edge $A^2$ is a groove $a'$ for the reception of the lip $b'$ of the inwardly-extending annular flange $b$ of the tire B. This inwardly-extending annular flange $b$, however, is arranged practically in line with the outer edge of the tire B, so that it is approximately flush therewith and is beyond the outer face of the hub or center A' of the body portion, as clearly seen in the drawings annexed hereto.

This improvement in changing the position of the inwardly-extending annular flange of the tire and placing it approximately flush with the outer or front edge thereof is an exceedingly important and valuable feature and overcomes the disadvantages of my former wheels. In the first place this new construction gives a much larger bearing-surface between the tire B and the center or body portion of the wheel, as is readily seen by comparing the same, and this bearing-surface is farther away from the line of rail wear on the tire. It also permits in the manufacture of the tire a much more extended compression of the tire by the rolls, especially in the line of rail wear, and consequently provides a better wearing quality to the wheel-tire in that it can be more thoroughly condensed and compressed, and consequently is more homogeneous in its structure. Furthermore, by arranging the inwardly-extending annular flange at the outer edge, or practically so, of the tire it is much more convenient to roll the tire and get a practically uniform compression throughout the wearing-surface of the tire, for when the flange projected from near the center of the tire it was exceedingly difficult to uniformly roll or compress the tire.

The tire may be secured to the body portion in any desired way, and I have shown in Figs. 2 and 3 the modes of securing the tire set forth in my patents above referred to, and it will be seen that either or both are applicable to my present invention without in any way interfering with the improved results set forth.

In the use of car-wheels composed, essentially, of a central body and separate tire mounted thereon, especially when they are used on rapidly-traveling trains where it is necessary to quickly stop the train or there are heavy grades, the long and close application of the brakes to the wheels has caused the tires to expand more or less by the heat generated by the friction between the brake and the wheel-tire. This heat has been sufficient in some instances to expand the tire so that it has slipped upon the body in a circumferential direction, and this often causes the removal of the wheels from the cars in order that they may be further inspected and tested before further use. I overcome this objection by securing the tire to the body against circumferential motion, and while this may be accomplished in various ways I find that by inserting a dowel-pin into the center or body portion of the wheel and engaging the tire the two can be secured together in such a way as to prevent any accidental circumferential slipping under the most severe tests. Thus in the drawings I have shown a recess $d$ in the face of the body portion A, in which is mounted a dowel-pin D, which extends through an opening $d'$ in the inwardly-extending annular flange $b$. The pin is preferably headed, as at $d^2$, on the inside of the flange, so that it cannot move out of its position in the recess $d$. Not only does this dowel-pin thus arranged serve the purpose of preventing the slipping of the tire on the wheel, but it also serves another purpose, and that is as a means of holding the wheel by a dog or driver to the face-plate of a lathe when the wheel is being re-turned or trued up after having been worn out of shape in service. Thus it will be seen that the dowel-pin performs two important functions and at the same time is extremely simple and inexpensive in construction.

While I have shown my improvements as applied particularly to the style of wheels shown in my prior patents, it will readily be understood that they may be applied to other wheels having a central body portion and separate tire secured thereto, and I therefore do not limit myself to the precise construction and arrangement of parts shown.

What I claim is—

The combination in a car-wheel, of a body portion having an extended outer surface, a tire having an inwardly-extended flange on its outer side, the said flange being approximately flush with the outer face of the tire and extending beyond the outer face of the center of the body portion, an inwardly-projecting flange on the inner face of the tire for securing the tire to the body portion against lateral displacement, and a pin extending through the outer flange and into the body portion for preventing the circumferential slipping of the tire upon the body portion, substantially as described.

In testimony whereof I have signed my name to this specification in the presence of two subscribing witnesses.

WILLIAM W. SNOW.

Witnesses:
 THEODORE WEYGAUT,
 E. C. RIPLEY.